(12) United States Patent
Visser

(10) Patent No.: US 7,819,620 B2
(45) Date of Patent: Oct. 26, 2010

(54) APPARATUS AND METHOD FOR MOVING OR POSITIONING WIDER OR NARROWER OF OBJECTS

(75) Inventor: Cornelis Frans Taco Visser, LJ 's-Gravendeel (NL)

(73) Assignee: Visser's-Gravendeel Holding B.V., S-Gravendeel (NL)

( * ) Notice: Subject to any disclaimer, the term of this patent is extended or adjusted under 35 U.S.C. 154(b) by 1016 days.

(21) Appl. No.: 10/498,363

(22) PCT Filed: Dec. 11, 2002

(86) PCT No.: PCT/NL02/00818

§ 371 (c)(1),
(2), (4) Date: Feb. 3, 2005

(87) PCT Pub. No.: WO03/049534

PCT Pub. Date: Jun. 19, 2003

(65) Prior Publication Data

US 2005/0135913 A1 Jun. 23, 2005

(30) Foreign Application Priority Data

Dec. 11, 2001 (NL) .................................... 1019537

(51) Int. Cl.
*B66F 9/12* (2006.01)
(52) U.S. Cl. ........................ 414/664; 414/528; 414/619
(58) Field of Classification Search ................... 414/25, 414/497, 509, 525.1, 528, 664, 673, 619; 47/1.01 P, 1.01 R
See application file for complete search history.

(56) References Cited

U.S. PATENT DOCUMENTS 5,244,334 A * 9/1993 Akita et al. .................. 414/502

FOREIGN PATENT DOCUMENTS

| EP | 0 395 166 | 3/1995 |
| EP | 1 455 566 B1 | 9/2004 |
| NL | 8 803 104 | 7/1990 |
| NL | 9 402 104 A | 7/1996 |
| WO | WO 94 07789 A | 4/1994 |
| WO | WO 97 07044 A1 | 2/1997 |

OTHER PUBLICATIONS

European Patent Office Decision dated Oct. 12, 2009 issued in corresponding European Application No. 02786238.2.
Canadian Notice of Allowance dated Mar. 18, 2010 for CA Application No. 2,469,295.

* cited by examiner

*Primary Examiner*—Michael S Lowe
(74) *Attorney, Agent, or Firm*—Harness, Dickey & Pierce, P.L.C.

(57) ABSTRACT

An apparatus is for displacing objects which can be picked up. The apparatus includes a fork-like member provided with teeth for picking up the objects, a transporting device connected to this member, a device for moving the fork-like member vertically, and a control device for controlling the transporting and moving devices. The apparatus includes at least one pair of mutually adjacent teeth of the fork-like member which is equipped with one flexible carrier arranged on each tooth and drivable in longitudinal direction of the tooth. When the objects are set down, this carrier can impart a determined speed to the objects such that the distance between two rows of set-down objects standing perpendicularly of the direction of the teeth can be regulated in a flexible manner by way of adjusting the speed of the carrier.

20 Claims, 3 Drawing Sheets

APPARATUS AND METHOD FOR MOVING OR POSITIONING WIDER OR NARROWER OF OBJECTS This application is the national phase under 35 U.S.C. §371 of PCT International Application No. PCT/NL02/00818 which has an International filing date of Dec. 11, 2002, which designated the United States of America and which claims priority on Dutch Patent Application number 1019537 filed Dec. 11, 2001, the entire contents of which is hereby incorporated herein by reference.

FIELD OF THE INVENTION

The invention generally relates to an apparatus for displacing objects which can be picked up. This may include an apparatus, comprising:
- a fork-like member provided with teeth for picking up the objects,
- transporting device connected to this member,
- device for moving the fork-like member vertically,
- control device for the transporting and moving devices.

BACKGROUND OF THE INVENTION

Apparatuses are generally known in the form of a fork-lift truck equipped with a fork, and are traditionally used in the displacement of objects such as flower pots. These objects must be provided with an edge or protruding portion allowing it to be picked up between the teeth of the fork. The standard flower pot for instance comes to mind here which is embodied as a pot with a protruding portion.

In the displacement of objects it may be advantageous to change the arrangement of the objects, and it may sometimes be wished to place the objects further apart or closer together. When the above described apparatus is used in a plant nursery, it will be desired for instance to be able to place the plant pots wider apart so that the growth of the plants is enhanced.

Such an apparatus can be embodied for this purpose with flaps arranged on the teeth, as known from the Dutch patent application NL-A-89.02377. These flaps can be driven such that not all objects are set down simultaneously, but for instance one of two rows of objects are placed and the objects held on the fork by the flaps can be placed elsewhere. Objects can hereby be so placed wider apart, but the distance between the placed objects cannot here be adjusted as a variable.

SUMMARY OF THE INVENTION

The apparatus according to an embodiment of the invention, has devised a more convenient solution herefor, and proposes a new system which has the feature that at least one pair of mutually adjacent teeth of the fork-like member is equipped with one flexible carrier arranged on each tooth and drivable in longitudinal direction of the tooth. When the pots are set down this carrier can impart a determined speed to the pots such that the distance between two rows of set-down pots standing perpendicularly of the direction of the teeth can be regulated in a flexible manner by way of adjusting the speed of the carrier.

The carrier can for instance be embodied, according to an embodiment of the invention, as a toothed belt or chain.

When such a carrier is loaded with the weight of the pots, it may happen that forces are exerted in the transverse direction of the carrier. In order to prevent the carrier shifting here, it is preferably equipped with a device for holding the flexible carrier in its place relative to the teeth in the case of transverse load.

In the case of for instance a chain, this can be provided with fingers for holding the chain in its place relative to the teeth in the case of transverse load.

In one embodiment of the invention, one flexible carrier is arranged on all teeth of the fork-like member, wherein these carriers are preferably driven by one common drive shaft. In this way the cost of the apparatus is limited to a minimum.

It will be the wish to be able to adjust precisely the mutual distance between the successive rows of objects for placing. In order to regulate this distance, the apparatus according to an embodiment of the invention is provided with a controller which can adjust the speed of the flexible carriers.

It is particularly advantageous if this controller can regulate the speed of the flexible carriers as a function of the speed of the transporting device. It is thus possible for instance to constantly regulate the net speed of the objects relative to the position where the objects come to stand, and the mutual distance between the set-down rows is determined by this constant speed and the original mutual distance.

An embodiment of the invention may further relate to a method for displacing objects which can be picked up, wherein a fork-like member provided with teeth picks up and subsequently sets down objects at another location.

As already stated above, it can be advantageous here to place the objects further apart or closer together. For this purpose the method according to an embodiment of the invention is distinguished by regulating the speed of the objects relative to the teeth, during picking up or setting down of the objects which can be picked up, by way of flexible carriers movable in longitudinal direction on the teeth, wherein each tooth has a maximum of one carrier. The regulating of this speed thus adjusts the mutual distance between the rows of objects set down perpendicularly of the tooth direction.

In the method according to an embodiment of the invention, it is usual for all the objects to be picked up at the same time by the fork and to be transported to the destination. The speed of the picked-up objects relative to the teeth is then regulated so as to be lower than the transporting speed of the teeth such that the set-down objects are set down in rows where the mutual distance between the rows is greater than their mutual distance when the objects are picked up.

In the preferred method the objects for picking up are disposed in a checkerboard pattern. This is a much used arrangement in plant nurseries, since a determined space is thus provided between the pots whereby the plants can grow unimpeded. After a time however the plants will increase in size and it will be desired to place them even further apart.

To this end, according to a method of an embodiment of the invention, the plants can all be picked up simultaneously and then be set down elsewhere, wherein the speed of the flexible carrier relative to the teeth is regulated during setting down such that the set-down objects from two adjacent rows have a mutual distance which is greater than their mutual distance in the original checkerboard pattern.

It will sometimes also be desired to place objects closer together. In the case of plant pots this could be the case when it is wished to transport the plants to a shop or market, and as many pots as possible are preferably transported simultaneously in a truck.

For placing together of objects, an embodiment of the invention provides a method wherein the speed of the flexible carrier relative to the teeth during setting down is regulated by means of the controller so as to be higher than the transporting speed of the teeth such that the set-down objects have a mutual distance which is smaller than their mutual distance when the objects are picked up.

BRIEF DESCRIPTION OF THE DRAWINGS

Further advantages, features and details of the invention will become evident from the description of illustrated embodiments given hereinbelow and the accompanying drawings, which are given by way of illustration only and thus are not limitative of the present invention, wherein.

DETAILED DESCRIPTION OF THE PREFERRED EMBODIMENTS

Figure 1:
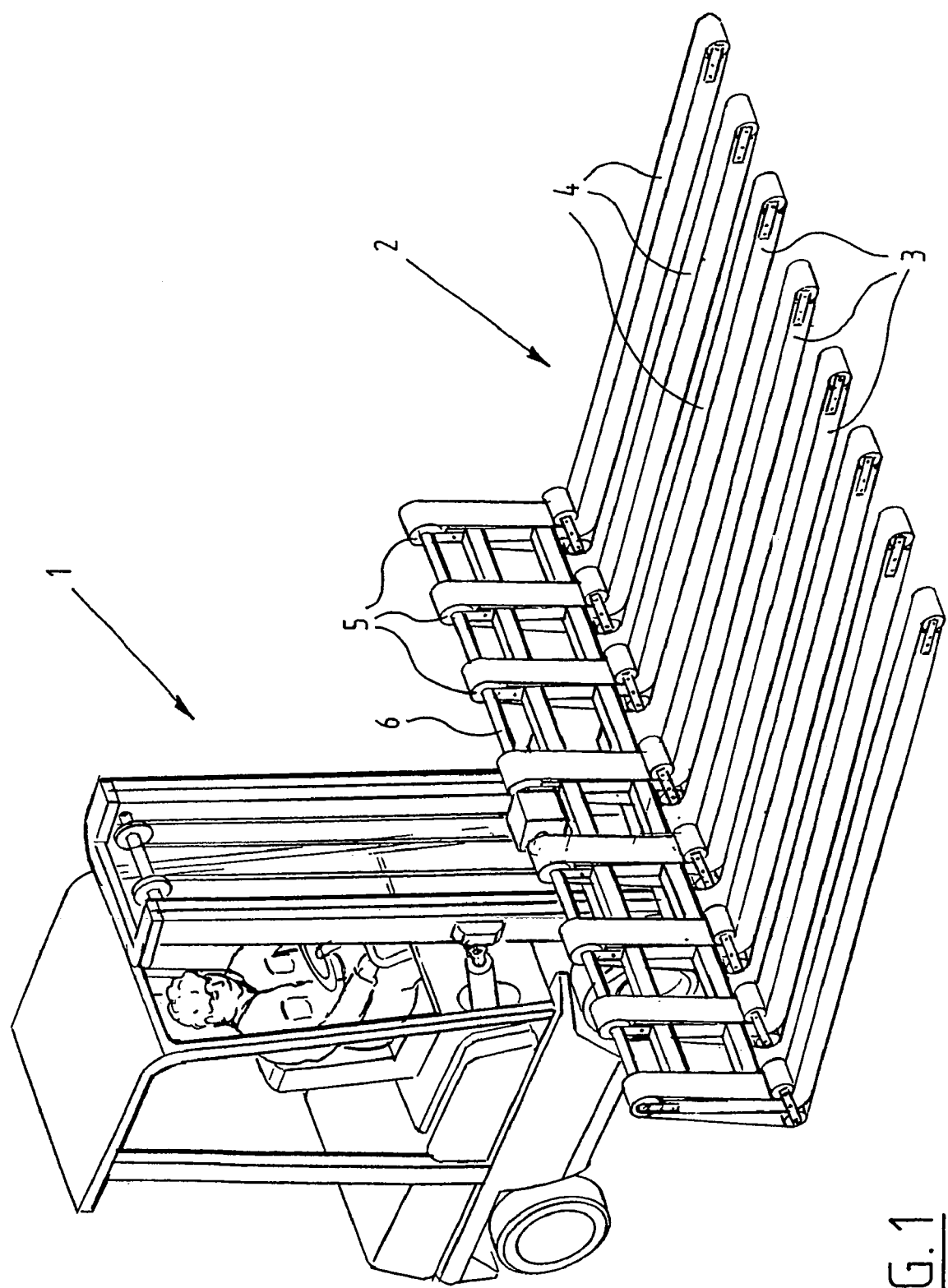
FIG. 1 is a perspective view of an apparatus according to an embodiment of the invention.

FIG. 1 shows a fork-lift truck 1 provided with a fork 2 with teeth 3. Each tooth 3 is equipped with a flexible carrier 4 which is coupled by a drive wheel to a common drive shaft 6, whereby carriers 4 are movable in longitudinal direction relative to teeth 3.

This flexible carrier can be formed by a chain or a belt, wherein the choice depends among other things on the nature of the objects it is wished to transport, and of course also on the cost-price of the two types of carrier.

Figure 3:
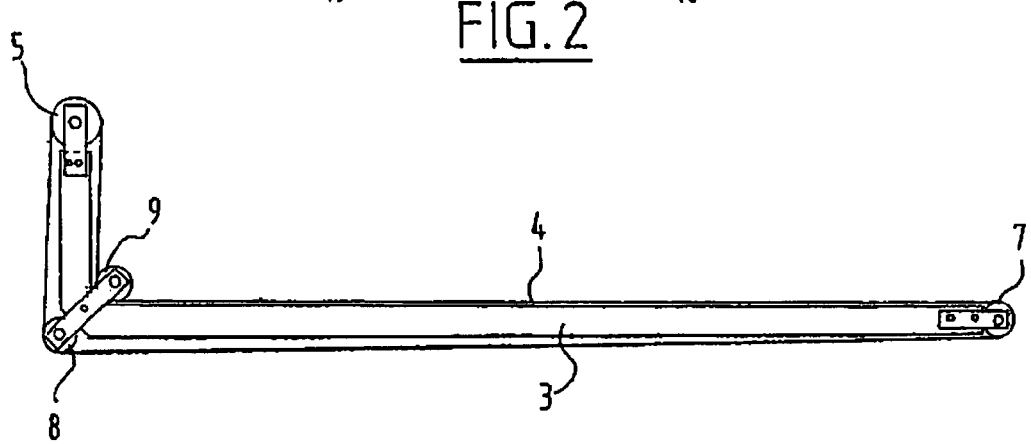
FIG. 3 shows a section in longitudinal direction of a tooth of an apparatus according to an embodiment of the invention.

Carrier 4 can for instance be arranged on tooth 3 by way of drive wheel 5 and three guide wheels 7, 8, 9 as shown in FIG. 3.

Figure 4:
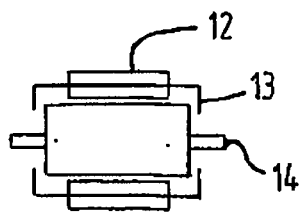
FIG. 4 shows a section in transverse direction of a tooth of an apparatus according to an embodiment of the invention.

FIG. 4 shows in cross-section a carrier 12 embodied as a chain, wherein some of the links of the chain are provided with fingers 13 so that the chain does not come off under transverse load. The tooth is provided on the sides with rods 14 for the bearings of guide wheel 7.

Figure 2:
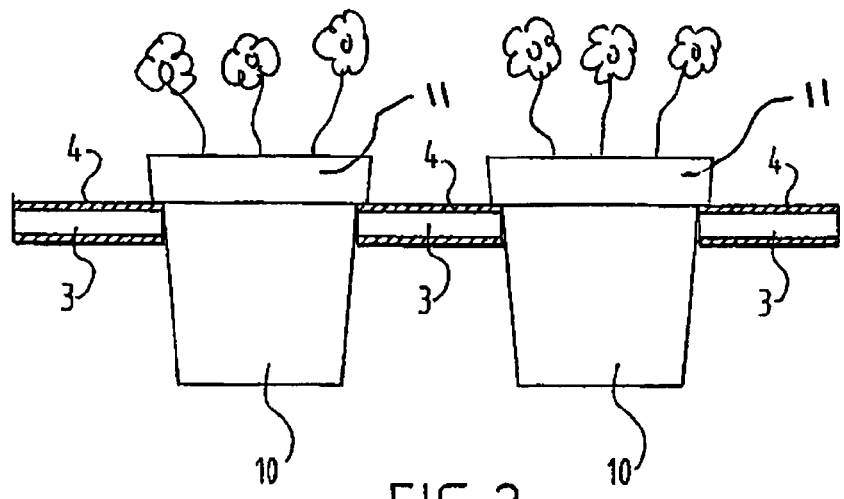
FIG. 2 shows a cross-section of three teeth of an apparatus according to an embodiment of the invention which are picking up pots.

The objects for moving are for instance flower pots 10 with an edge 11 which can be picked up between teeth 3, wherein the edges 11 support on carriers 4 as shown in FIG. 2.

Machines are generally available in plant nurseries which set down the plant pots in a checkerboard pattern, since it has been found that this pattern is very suitable for a uniform, unobstructed growth of the plants. After a time however, the plants will have increased in size and it will be desired to place them even further apart.

Figure 5A:
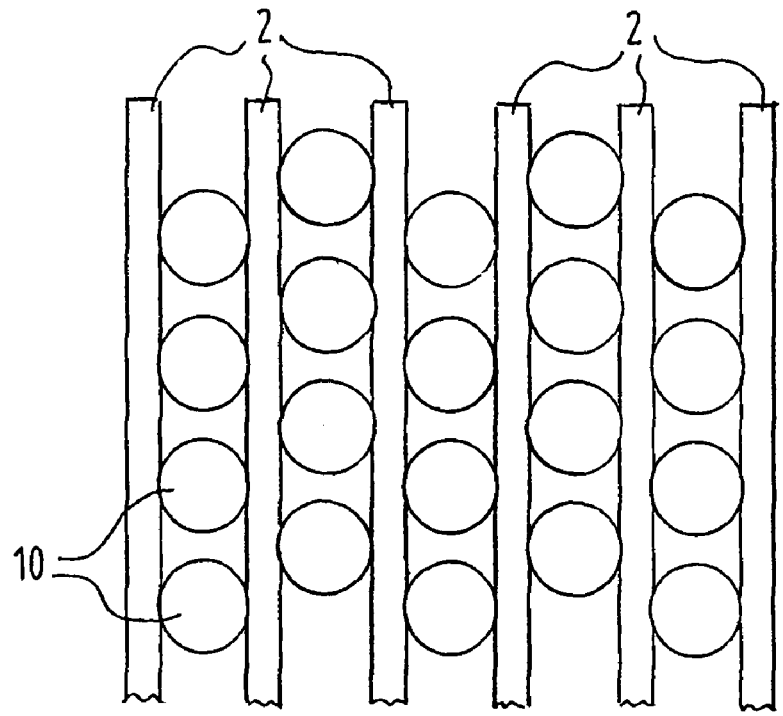
FIG. 5 shows a series of pots disposed in a checkerboard pattern, and the resulting pattern after picking up and subsequently setting-down the pots according to a method of an embodiment of the invention.

FIG. 5 illustrates a preferred method of an embodiment of the invention, wherein the pots 10 in a checkerboard pattern are all picked up simultaneously by fork 2 (FIG. 5A). This takes place by carrying the fork downward to a height where the teeth lie lower than the edge of the pots. The driver then moves in the direction of the rows of pots such that the teeth lie along the edges of all pots for transporting. The fork is then moved upward, and the pots can be transported by fork-lift truck 1 to the desired destination. Upon arrival at the desired destination the fork is moved downward such that the pots almost touch the ground. The fork-lift truck then reverses and the carrier is driven at a speed which is lower than the speed at which the truck is reversing.

Figure 5B:
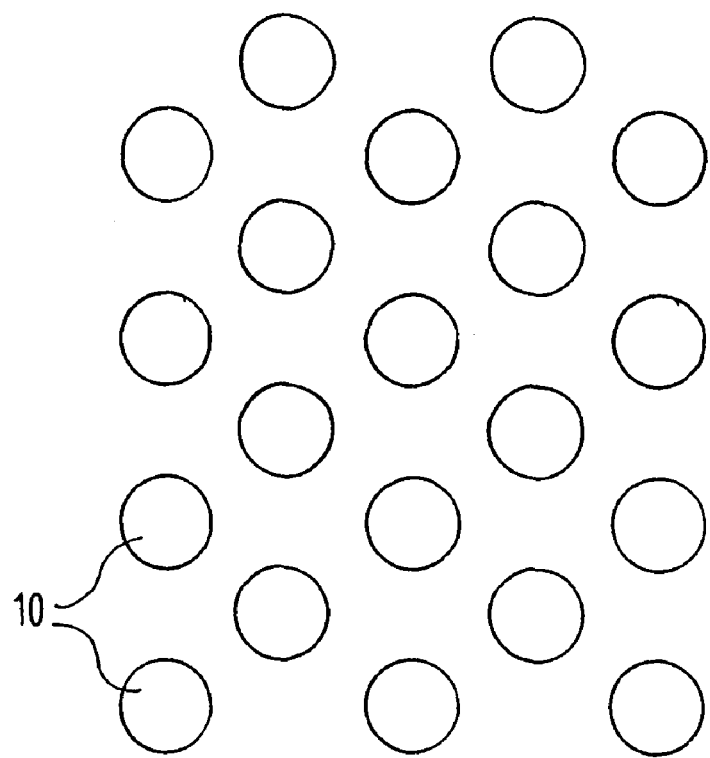

In this manner the pots are pushed row by row from the carriers and the set-down objects from two mutually adjacent rows have a mutual distance which is greater than their mutual distance in the original checkerboard pattern, as shown in FIG. 5B.

The speed of the carriers during setting down of the pots can either be regulated constantly or regulated as a function of the travel speed of the fork-lift truck. This latter method is particularly useful because the driver does not then have to reverse at a constant speed during setting down, and the pots can still be placed wider apart at a constant distance between the rows.

The lower the carrier speed is regulated as a function of the reversing speed, the further apart the rows will come to stand, wherein the mutual distance between two rows can thus be precisely adjusted, and is given by the product of the original mutual distance and the quotient of the fork-lift truck speed and the carrier speed. This quotient thus determines the difference in mutual distance between two rows before and after the pots are set down, and this quotient must therefore be regulated constantly if it is wished that this difference be constant.

This method can of course be repeated many times in order to place the pots further and further apart as the size of the plants increases. The plants can also be placed closer together again when it is wished for instance to transport them to a market or a shop. The method is herein identical to that described above, with the difference that the carrier speed must be regulated so as to be faster than the reversing speed of the fork-lift truck during the setting-down.

The invention is of course not limited to the above described embodiments, and can for instance be modified for the purpose of picking up other objects, or can be embodied with different drive shafts, whereby the carriers can be driven at a different speed. Many other variants can thus be envisaged which all fall within the domain of the invention.

Exemplary embodiments being thus described, it will be obvious that the same may be varied in many ways. Such variations are not to be regarded as a departure from the spirit and scope of the present invention, and all such modifications as would be obvious to one skilled in the art are intended to be included within the scope of the following claims.

The invention claimed is:

1. A mobile apparatus for displacing objects which can be picked up, comprising:
   a fork-like member provided with mutually adjacent teeth and only one flexible carrier arranged on each tooth, the mutually adjacent teeth configured to pick up objects suspended between the teeth, said flexible carrier being drivable in a longitudinal direction of the teeth and having a lateral width along the length of the teeth that is configured to move the objects longitudinally between the teeth,
   a transporting device connected to the fork-like member,
   a device for moving the fork-like member vertically, and
   a control device for controlling the transporting and moving devices, the fork-like member including at least three of said teeth each having the flexible carrier arranged on a horizontal side thereof.

2. Apparatus as claimed in claim 1, wherein the flexible carrier is provided with means for holding the flexible carrier in its place relative to the teeth in the case of transverse load.

3. Apparatus as claimed in claim 2, wherein the flexible carrier is a toothed belt.

4. Apparatus as claimed in claim 2, wherein the flexible carrier is a chain.

5. Apparatus as claimed in claim 1, wherein the flexible carrier is a toothed belt.

6. Apparatus as claimed in claim 1, wherein the flexible carrier is a chain.

7. Apparatus as claimed in claim 6, wherein the chain is provided with fingers for holding the chain in its place relative to the teeth in the case of transverse load.

8. Apparatus as claimed in claim 1, wherein the transporting and moving devices are a fork-lift truck.

9. Apparatus as claimed in claim 1, wherein all flexible carriers are driven by a common drive shaft.

10. Apparatus as claimed in claim 1, wherein movement of the flexible carriers in the longitudinal direction is adjusted via a controller, to control a speed of the flexible carrier movement.

11. Apparatus as claimed in claim 10, wherein the speed of the flexible carriers can be regulated as a function of a speed of movement of the transporting device using the control device and the controller.

12. Apparatus as claimed in claim 1, wherein the lateral width of the flexible carrier is configured to move the objects longitudinally between the teeth by being wide enough, relative to the width of the teeth, to contact an edge surface of the objects when the objects are suspended between the teeth.

13. Method for displacing objects which can be picked up, comprising:
  using a fork-like member provided with mutually adjacent teeth and only one flexible carrier arranged on each tooth, the mutually adjacent teeth configured to pick up objects suspended between the teeth, said flexible carrier being drivable in a longitudinal direction of the teeth and having a lateral width along the length of the teeth that is configured to move the objects longitudinally between the teeth and subsequently set down the objects at another location, the fork-like member including at least three teeth each having the flexible carrier arranged on a horizontal side thereof,
  transporting the fork-like member using a transporting device connected to the fork-like member,
  moving the fork-like member vertically using a moving device, and
  controlling the transporting and moving devices using a control device.

14. Method as claimed in claim 13, wherein during the picking up or settling down of the objects, a speed of movement of the objects relative to the teeth is regulated by means of the flexible carrier movable in a longitudinal direction on the teeth.

15. Method as claimed in claim 14, wherein the objects are all picked up at the same time, and wherein the speed of movement of the objects relative to the teeth is regulated so as to be lower than the transporting speed of the teeth when the objects are set down.

16. Method as claimed in claim 15, wherein the objects to be picked up are disposed in accordance with a checkerboard pattern consisting of rows placed perpendicularly of the teeth, and wherein a speed of movement of the flexible carrier relative to the teeth is regulated during setting down such that the distance between two set-down rows is greater than their mutual distance in the original checkerboard pattern.

17. Method as claimed in claim 14, wherein the objects are all picked up at the same time, and a speed of the flexible carrier relative to the teeth during setting down is regulated so as to be higher than the transporting speed of the teeth.

18. A mobile apparatus for displacing objects, comprising:
  first means; provided with teeth, for picking up the objects suspended between the teeth, the first means having at least three teeth; and
  means for moving the first means vertically, wherein at least one pair of mutually adjacent teeth of the first means is equipped with one flexible carrier arranged on a horizontal side of each tooth and drivable in longitudinal direction of the tooth, the flexible carrier having a width along the length of the teeth that is configured to move the objects longitudinally between the teeth.

19. Apparatus as claimed in claim 18, further comprising:
  means for transporting the first means; and
  control means for controlling the means for transporting and the means for moving.

20. Apparatus as claimed in claim 18, wherein the flexible carrier is provided with means for holding the flexible carrier in its place relative to the teeth in the case of transverse load.

* * * * *